No. 691,545. Patented Jan. 21, 1902.
C. E. HOLLAND.
PORTABLE WATER PURIFIER AND FILTER.
(Application filed Jan. 9, 1901.)
(No Model.)
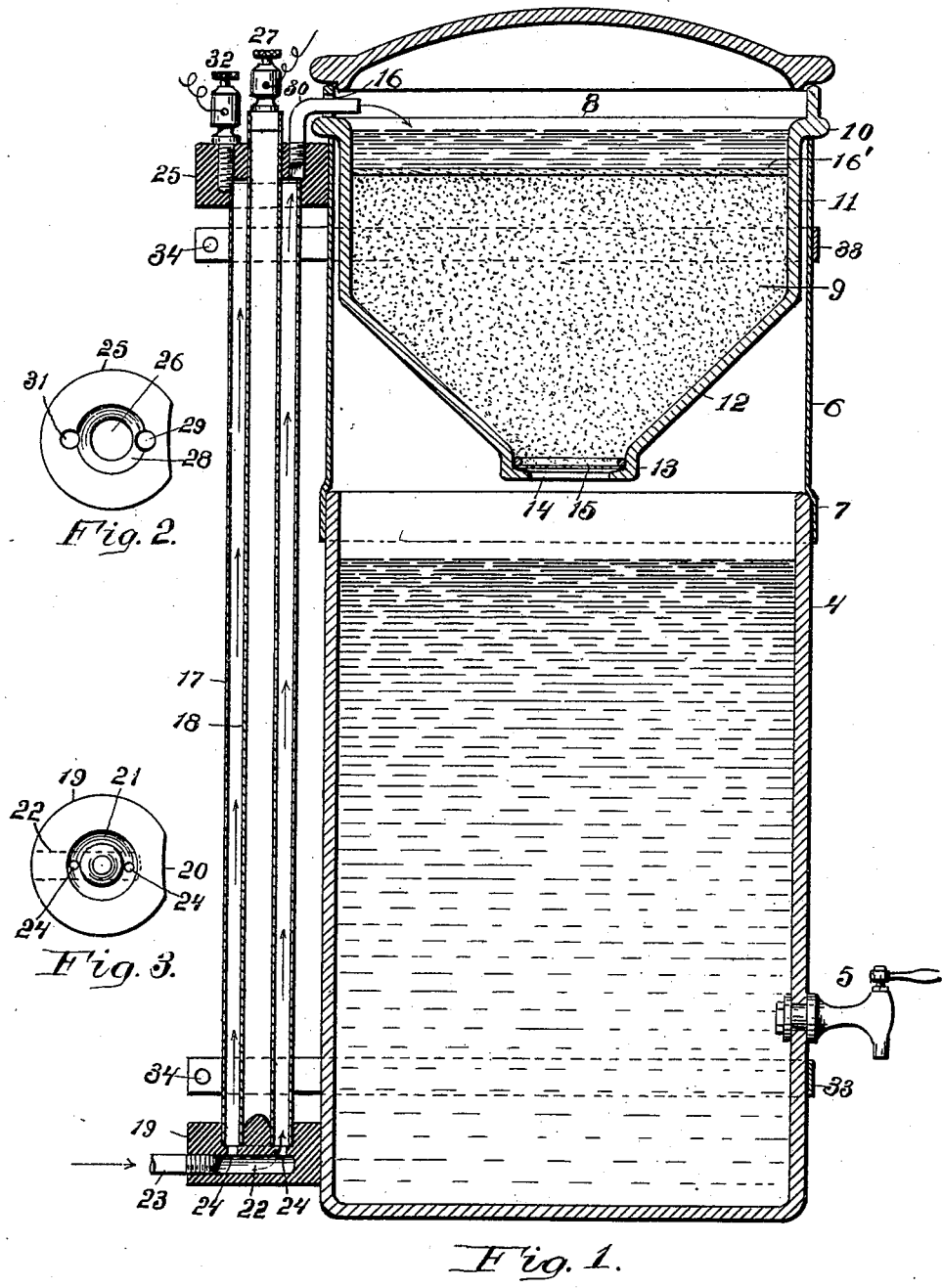

UNITED STATES PATENT OFFICE.

CHARLES EDWIN HOLLAND, OF NEW YORK, N. Y., ASSIGNOR TO THE ELECTRIC PURIFYING COMPANY, A CORPORATION OF NEW JERSEY.

PORTABLE WATER PURIFIER AND FILTER.

SPECIFICATION forming part of Letters Patent No. 691,545, dated January 21, 1902.

Application filed January 9, 1901. Serial No. 42,591. (No model.)

*To all whom it may concern:*

Be it known that I, CHARLES EDWIN HOLLAND, a citizen of the United States, and a resident of New York, in the county of New York and State of New York, have invented certain new and useful Improvements in Portable Water Purifiers and Filters, of which the following is a specification.

The object of this invention is to provide a portable water purifier and filter so arranged that the filtering and purifying apparatus are made in separate receptacles, which may be attached to each other when in use and so constructed that they may be readily separated for cleansing purposes or for replenishing the materials.

It relates to that class of apparatus wherein the purification is performed by electrolysis and in which the current used may be generated by a battery forming a part of the apparatus or the current may be obtained by external means.

It consists, essentially, of a water-reservoir having, preferably, a filtering material therein at its upper end and surmounted by a cover. At one side of this reservoir is attached an electrolytic purifying apparatus which may be removed without removing the cover or otherwise disturbing the filtering portion of the apparatus, as will now be set forth in detail.

In the drawings, Figure 1 is a central vertical sectional view of a combined purifying and filtering apparatus. Fig. 2 is a view of the lower side of the insulated head of the purifier, and Fig. 3 a top view of the insulated base for the purifier.

In constructing the invention I provide an ordinary water-reservoir 4, such as is usually used for water-filters, which may be mounted on a suitable base and is provided with a faucet 5 at one side near the base. On the upper end of the reservoir is mounted a cylindrical shell 6, expanded at its lower end, as at 7, so as to adapt it to fit on the end of the reservoir. Within this shell is placed a funnel-shaped filtering-receptacle 8 to receive the filtering material 9. This receptacle has near its upper end an external annular bead 10 to provide a resting-shoulder for its support on the end of the shell 6, and the vertical wall 11 of the receptacle is sufficiently reduced to permit it to rest within the shell 6. The lower end of the receptacle is funnel-shaped, as shown at 12, terminating in a flanged socket 13, having a central opening 14. A strainer 15 is held in the flanged socket by any suitable means. The body of the receptacle extends a short distance above the brace 10, and at one side is a hole 16, in which the supply-pipe is placed.

The upper end of the reservoir 8 has therein a reticulated partition 16', or it may be made of asbestos or other material, through which water will freely percolate. This partition rests on the filtering material 9.

The purifying apparatus is composed of an outer tubular electrode 17 and an inner tubular electrode 18, both made of aluminium, the lower ends of which rest in a base 19, composed of insulating material, made, preferably, circular in form, with one side cut away, as at 20, so that it will rest against the reservoir 4, as shown in Fig. 3. The base-piece has an annular groove 21, the outer wall of which is adapted to contact with the outer tubular electrode 17 and the inner wall with the inner tubular electrode 18. The outer electrode 17 is preferably rigidly secured to the base by cement or otherwise; but the inner electrode may be made removable; but in both cases the contact should be water-tight, so as to prevent leakage. A horizontal hole 22 is formed in one side to receive the supply-tube 23, and this hole communicates with the space between the two tubes by means of the small holes 24.

The upper ends of the tubular electrodes are held by a head 25, also made of insulating material. This head has centrally an aperture 26 to receive the inner tubular electrode 18, which latter extends a short distance above the head 25, terminating with a binding-post 27. An annular socket 28 surrounds the central aperture 26, in which the upper end of the tubular electrode is held. A hole 29 is formed through the upper side of the head, in which is a bent tube 30, the upper end of which projects through the aperture 16 in the receptacle 8. The lower end of the hole 29 communicates with the space between the two electrodes, so that the water can flow from the purifier into the filter. A hole 31 is also formed through the upper side of the head, into which is screwed a binding-post 32, which contacts with the outer tubular electrode 17.

It will readily be understood that the inner tube 18 and the outer tube 17 comprise the electrodes for the purifying apparatus. It will thus be seen that the tube 18, contained within the tube 17, can be removed without in any manner interfering with the filtering-reservoir, and the cover and filtering material of the reservoir can be removed without disturbing the purifier, thus eliminating the objections urged against having the purifying apparatus within the filtering-reservoir.

The purifying apparatus being made of two tubes of aluminium is very simple and has the additional advantage that it can be applied to any kind or construction of filter, in which case the electric power may be taken from a local circuit, if desired, the object being to provide a cheap and simple purifier attached to any reservoir and which will purify the water transmitted to the reservoir. The purifying-tubes are secured to the filter by means of bands 33, strapped around the reservoir 4 and shell 6, and held by bolts through the holes 34 or by other suitable means.

What I claim as new is—

1. The combination of an outer metallic tube, having a head at its upper end and a base at its lower end, a smaller metallic tube concentrically arranged within the outer tube, closed at its lower end within the base-piece, a water-inlet in the base between the two tubes, and a discharge-opening in the head, the upper end of the inner tube projecting through the headpiece, and each tube having a binding-post attached thereto, as set forth.

2. The combination of an outer aluminium tube having an insulated head at its upper end, said head having a discharge-opening and a binding-post in contact with said outer tube, an insulated base at the lower end of said outer tube having a supply-tube and inlets, and an inner tube also of conducting material socketed in the insulated base and passing through the upper insulated head and provided with a binding-post, as set forth.

3. The combination of an outer tubular electrode having a head of insulating material and a base of insulating material, a tubular electrode within also secured to said head and base, said insulated base having a water-inlet and ducts leading to the space between said tubes, and the insulated head having a water-discharge orifice, and a binding-post in contact with the outer tube, and a binding-post attached to said inner tube, as set forth.

4. The combination of a water-purifying apparatus, comprising an outer tubular and an inner metallic electrode, provided with a base and a head of insulating material, and means for receiving and discharging water in the base and head, and a pipe in the head adapted to conduct water from the purifying to the filtering apparatus, as set forth.

5. The combination of a water-purifying apparatus, comprising an outer and inner tube of aluminium forming electrodes in an electric circuit, having a base and a head of insulating material, a filter secured alongside, means for conducting water upwardly between said tubes, and a discharge-tube communicating between the head and filter to convey the purified water from the purifier to said filter, as set forth.

6. A water-purifier comprising an outer metallic tube and an inner concentrically-arranged metallic tube forming electrodes in an electric circuit, said outer tube having a base of insulating material provided with a water-supply pipe and a head of insulating material provided with a discharge-tube at the other end, and means whereby said purifying apparatus may be removably attached to a water-filter, in combination with said filter, and with a tube communicating between the purifier and filter, as set forth.

Signed at New York city, in the county of New York and State of New York, this 2d day of January, A. D. 1901.

CHARLES EDWIN HOLLAND.

Witnesses:
H. W. HELFER,
E. L. MASON.